US006663566B2

(12) United States Patent
Pan et al.

(10) Patent No.: US 6,663,566 B2
(45) Date of Patent: Dec. 16, 2003

(54) METHOD AND APPARATUS FOR AUTOMATIC CONTROL OF SPECTRAL DOPPLER IMAGING

(75) Inventors: Lihong Pan, Brookfield, WI (US); Richard Kulakowski, Richfield, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 191 days.

(21) Appl. No.: 09/683,810

(22) Filed: Feb. 19, 2002

(65) Prior Publication Data

US 2003/0158484 A1 Aug. 21, 2003

(51) Int. Cl.[7] .................................................. A61B 8/06
(52) U.S. Cl. ..................................................... 600/454
(58) Field of Search ............................... 600/453–456; 73/861.25

(56) References Cited

U.S. PATENT DOCUMENTS

| | | | | |
|---|---|---|---|---|
| 5,287,753 A | * | 2/1994 | Roputh et al. ............ | 73/861.25 |
| 5,582,176 A | * | 12/1996 | Swerling et al. ............ | 600/454 |
| 5,606,972 A | * | 3/1997 | Routh ........................ | 600/455 |
| 5,634,465 A | * | 6/1997 | Schmiesing et al. ........ | 600/454 |
| 5,647,366 A | * | 7/1997 | Weng .......................... | 600/455 |
| 5,724,974 A | * | 3/1998 | Goodsell, Jr. et al. ...... | 600/455 |
| 5,868,676 A | * | 2/1999 | McCabe et al. ............. | 600/454 |
| 5,935,074 A | | 8/1999 | Mo et al. | |
| 6,142,943 A | * | 11/2000 | Mo et al. ...................... | 600/447 |
| 6,176,143 B1 | * | 1/2001 | Mo et al. ................. | 73/861.25 |
| 6,176,830 B1 | * | 1/2001 | Freiburger ................... | 600/453 |
| 6,213,947 B1 | * | 4/2001 | Phillips ....................... | 600/443 |
| 6,221,020 B1 | * | 4/2001 | Lysyansky et al. ......... | 600/453 |
| 6,296,612 B1 | * | 10/2001 | Mo et al. ..................... | 600/455 |
| 6,447,455 B2 | * | 9/2002 | Bang et al. .................. | 600/454 |

* cited by examiner

*Primary Examiner*—Francis J. Jaworski
(74) *Attorney, Agent, or Firm*—McAndrews, Held & Malloy, Ltd.; Peter J. Vogel; Michael A. Dellapenna (57) ABSTRACT

An ultrasound system is disclosed that includes a method and apparatus to automatically adjust certain parameters that affect visualization of a Doppler spectral image. The ultrasound system acquires spectral lines of Doppler data generated by the ultrasound system. A data processor within the ultrasound system determines the presence of aliasing and estimates noise levels from the spectral lines of Doppler data. The data processor then automatically adjusts system parameters such as pulse repetition frequency (PRF), baseline shift, and spectrum orientation in response to aliasing and noise levels. The data processor of the ultrasound system also determines positive and negative signal boundaries for each spectral line of Doppler data and a display architecture processes the signal boundary data to display a spectral trace corresponding to the edges of the spectral lines.

30 Claims, 7 Drawing Sheets

METHOD AND APPARATUS FOR AUTOMATIC CONTROL OF SPECTRAL DOPPLER IMAGING

BACKGROUND OF INVENTION

Certain embodiments of the present invention relate to a medical diagnostic ultrasound system for imaging blood flow within a human subject. More particularly, certain embodiments relate to a method and apparatus for automatically controlling spectral Doppler imaging for a sample gate within a scan plane.

Ultrasound systems to detect and image blood flow based on the Doppler effect are well established. An operator typically places a sampling gate over a location in an image to be measured in a subject. For example, the sampling gate may be placed over an artery in the subject's kidney. Ultrasound energy is transmitted into the subject by an emitting transducer and reflected energy is received by the transducer in the form of waves. To measure the velocity of blood flow within a sampling gate within the subject, the phase and amplitude of the reflected waves are detected and the information is compared to a reference frequency to discern the Doppler shifts (frequency shifts) experienced by the reflected waves by the moving blood cells within the sampling gate.

For a given instant in time, the Doppler information for a given sampling gate may extend over a range of frequencies. The information is represented by the ultrasound system as a spectral line of frequency or velocity information. The spectral line of information represents the estimated instantaneous velocity of the blood flow within the sampling gate. A spectral display may be formed that plots the spectral line for each instant in time over, for example, a cardiac cycle. The resultant display format is Doppler frequency (or velocity) versus time. The spectral information may be displayed in real time using grey-scale coding to represent the signal strength or power in the spectral signal at the various frequencies.

The data in each spectral line comprises a plurality of frequency bins and the signal strength (power) associated with each frequency bin is displayed in a corresponding pixel location on the display. All of the spectral lines taken together form a spectrogram. Sometimes the spectrogram may be aliased. When a spectrogram is aliased, the displayed spectrogram is wrapped around the velocity scale limit such that positive velocity values may appear negative and vice versa. If the total spectral bandwidth of the signal is less than the pulse repetition frequency (PRF), a simple shift of the baseline may effectively unwrap the spectrum. If the spectral bandwidth is larger than the PRF, the spectrum may not be unwrapped by adjusting the baseline position. Instead, the velocity scale, PRF, should be increased. Also, the vertical orientation of the Doppler spectrum may provide for better intuitive visualization if the spectrum is inverted.

Certain standard diagnostic Doppler indices are based on frequency estimates at a particular segment in the cardiac cycle such as peak systole or end diastole. An operator often desires to trace the peaks of the spectral lines across the display so the indices may be calculated. Manual tracing is often very difficult, time consuming and inaccurate.

Ultrasound systems have been proposed that automatically eliminate aliasing in Doppler spectral images by adjusting the PRF (velocity scale) based on pre-calculated noise levels. The pre-calculated noise levels are used to predict if the spectral waveform is aliased and/or inverted. The algorithm shifts the baseline and/or inverts the velocity scale to position the spectral waveform in the desired portion in the timeline display, or increases the PRF to expand the velocity scale in order to eliminate aliasing in the spectral image. The predicted noise levels are also used to determine the peaks of the spectral lines so a trace may be drawn on the display. The performance of the method relies on the accuracy of the pre-calculated noise level estimates.

For example, one method described in U.S. Pat. No. 5,935,074 predicts the mean noise level in the background of the spectral image. The pre-amp Johnson noise is calculated. The noise is adjusted for all of the filters in the Doppler signal path. The quantization noise due to analog-to-digital conversion is added to the noise estimate. The noise is summed over all active receiving channels taking into account transducer array apodization effects. The noise is converted to the mean noise level in the spectral display through dynamic range compression. The method, however, is system configuration dependent. Also, if the noise prediction is inaccurate at any stage in the signal path, then the entire prediction is suspect.

A need exists for an approach to automatically control certain parameters associated with spectral Doppler imaging based only on noise levels and signal levels actually present in the lines of Doppler spectral data without relying on any pre-calculated predictions of noise at various system stages and without assuming that a certain region of an image contains only noise. A need exists for a way to automatically eliminate aliasing, and adjust the baseline and orientation of the spectral signal, if necessary, to present a visually desirable display of the spectral signal to an operator. A need also exists to generate a spectral trace of the spectral signal based only on the lines of spectral Doppler data and estimated noise levels.

SUMMARY OF INVENTION

An embodiment of the present invention provides an ultrasound system for imaging velocity information of a location within a subject, designated by a sampling gate, by automatically controlling certain parameters that affect Doppler spectral imaging corresponding to the location. Automatic adjustment of certain parameters associated with Doppler spectral imaging results in eliminating aliasing, setting the baseline to a more desirable location on the display, and inverting the Doppler spectral image. Spectral lines of Doppler data generated by the ultrasound system are acquired. The presence of aliasing and estimates of noise levels and signal boundaries are determined by the system from the spectral lines of Doppler data. The system automatically adjusts certain parameters such as pulse repetition frequency (PRF), baseline shift, and spectrum orientation in response to aliasing, noise levels, and signal boundaries. The system also determines a positive signal boundary and a negative signal boundary for each spectral line of Doppler data and processes the signal boundary data to display a spectral trace corresponding to the edges of the spectral lines.

An apparatus is provided for controlling certain parameters associated with a Doppler spectral display generated by an ultrasound system corresponding to a location within a scan plane designated by a sample gate. The apparatus includes a transducer for transmitting and receiving ultrasound signals and a beamformer for deriving data samples representative of the reflected ultrasound signals from a designated location within a scan plane. Also, a Doppler processing module for generating raw spectral Doppler data from the data samples is provided. A scan conversion module scan converts the raw spectral Doppler data and a data processing module analyzes a plurality of spectral lines of Doppler data and automatically adjusts certain system parameters to control visualization of a Doppler spectral image. A display architecture displays the Doppler spectral image corresponding to the designated location within the scan plane. The data processing module may also generate signal boundary data corresponding to the edges of the spectral lines of Doppler data and the display architecture may generate and display a spectral trace corresponding to the edges of the spectral lines.

A method is also provided for controlling certain parameters associated with a Doppler spectral display generated by an ultrasound system corresponding to a location within a scan plane designated by a sample gate. The method includes acquiring a plurality of spectral lines of Doppler data generated by the ultrasound system. The presence of aliasing is determined from the plurality of spectral lines of Doppler data. Also, noise levels and signal boundaries are estimated from the plurality of spectral lines of Doppler data. System parameters are automatically adjusted, if necessary, including pulse repetition frequency, baseline shift, and spectrum orientation in response to a determination of the presence of aliasing and an estimation of noise levels and signal boundaries. A spectral trace corresponding to the edges of the spectral lines may also be generated and displayed.

Certain embodiments of the present invention afford an approach to automatically control certain parameters associated with the generation of a Doppler spectral image. Automatic control allows the system to eliminate aliasing, set the baseline, and invert the image, if necessary, by processing only the spectral lines of Doppler data corresponding to the designated location. The generation of a spectral trace corresponding to the edges of the spectral lines is also achieved.

DETAILED DESCRIPTION

Figure 1:
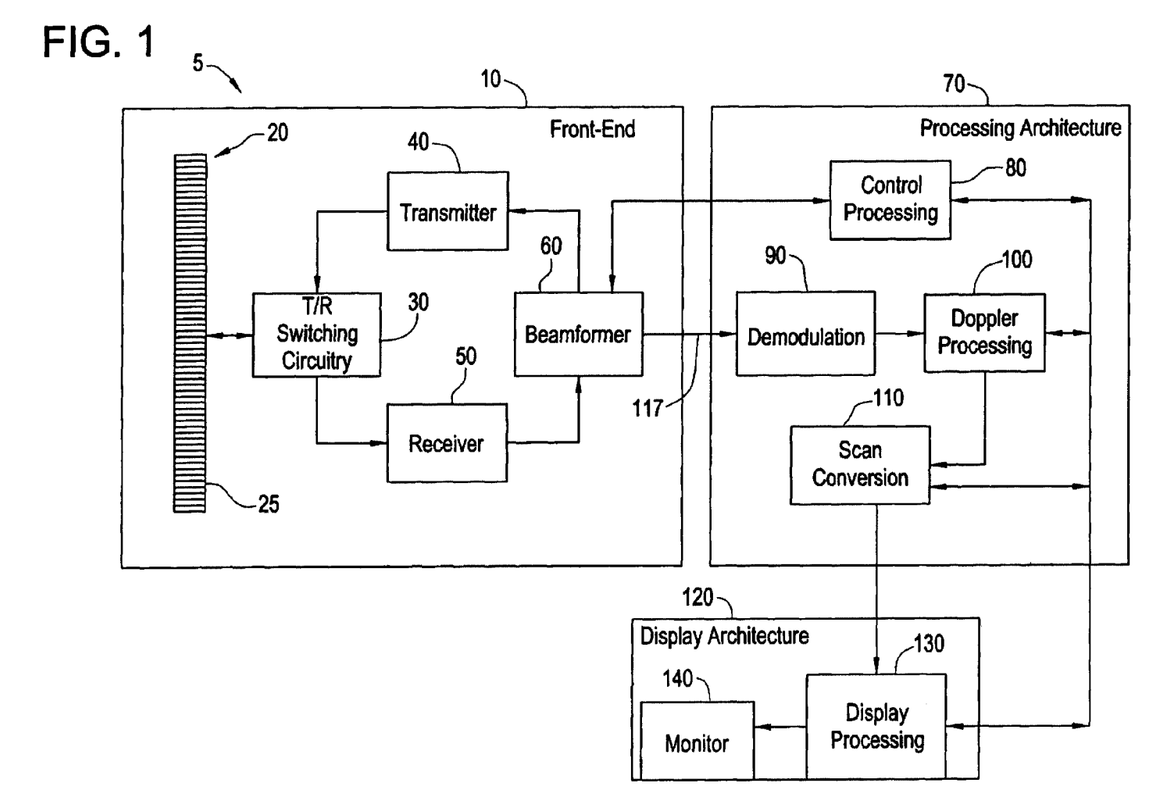
FIG. 1 is a schematic block diagram of an ultrasound system formed in accordance with an embodiment of the present invention.

FIG. 1 is a schematic block diagram of an ultrasound system 5 for generating and controlling a spectral Doppler image in accordance with an embodiment of the present invention. The illustrated elements of the ultrasound system 5 are the front-end 10, the processing architecture 70, and the display architecture 120. Front-end 10 comprises a transducer array 20 (comprising a plurality of transducer array elements 25), transmit/receive switching circuitry 30, a transmitter 40, a receiver 50, and a beamformer 60. Processing architecture 70 comprises a control processing module 80, a demodulation module 90, a Doppler processing module 100, and a scan conversion module 110. Display architecture 120 comprises a display processing module 130 and a monitor 140.

The architectures and modules may be dedicated hardware elements such as circuit boards with digital signal processors or may be software running on a general purpose computer or processor such as a commercial, off-the-shelf PC. The various architectures and modules may be combined or separated according to various embodiments of the present invention.

In the front-end 10, the transducer array 20 is connected to the transmit/receive (T/R) switching circuitry 30. The T/R switching circuitry 30 is connected to the output of transmitter 40 and the input of receiver 50. The output of receiver 50 is input to beamformer 60. Beamformer 60 is further connected to the input of transmitter 40, to control processing module 80 and the input of demodulation module 90 in processing architecture 70.

In processing architecture 70, the output of demodulation module 90 is connected to an input of Doppler processing module 100. Control processing module 80 interfaces to Doppler processing module 100, scan conversion module 110, and display processing module 130 in display architecture 120. An output of Doppler processing module 100 is connected to an input of scan conversion module 110. An output of scan conversion module 110 is connected to an input of display processing module 130 in display architecture 120. In display architecture 120, the output of display processing module 130 is connected to the input of monitor 140.

To generate a transmitted ultrasound beam, the control processing module 80 sends command data to the beamformer 60 which tells the beamformer to generate transmit parameters to create a beam of a certain shape that originates from a certain point at the surface of the transducer array 20 at a certain steering angle. The transmit parameters are sent from the beamformer 60 to the transmitter 40. The transmitter 40 uses the transmit parameters to properly encode transmit signals to be sent to the transducer array 20 through the T/R switching circuitry 30. The transmit signals are set at certain levels and phases with respect to each other and are provided to individual transducer elements 25 of the transducer array 20. The transmit signals excite the transducer elements 25 of the transducer array 20 to emit ultrasound waves with the same phase and level relationships. As a result, a transmitted beam of ultrasound energy is formed in a subject within a scan plane 150 (see FIG. 2) along a scan line 155 when the transducer array 20 is acoustically coupled to the subject by using, for example, ultrasound gel. This process is known as electronic scanning.

The transducer array 20 is a two-way transducer. Once ultrasound waves are transmitted into a subject, the ultrasound waves are backscattered off of tissue and blood sample within the structure. The backscattered waves arrive at the transducer array 20 at different times, depending on the distance into the tissue they return from and the angle with respect to the surface of the transducer array 20 at which they return. The transducer elements 25 of the transducer array 20 are responsive to the backscattered waves and convert the ultrasound energy from the backscattered waves into received electrical signals.

The received electrical signals are routed through the T/R switching circuitry 30 to the receiver 50. The receiver 50 amplifies and digitizes the received signals and provides other functions such as gain compensation. The digitized received signals correspond to the backscattered waves received by each transducer element 25 at various times and preserve the amplitude and phase information of the backscattered waves.

Figure 2:
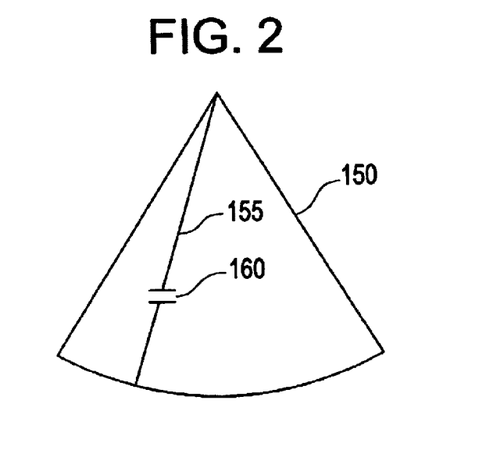
FIG. 2 is an illustration of a sector scan with a sample gate along a scan line for a spectral Doppler mode.

The digitized received signals are sent to beamformer 60. The control processing module 80 sends command data to beamformer 60. Beamformer 60 uses the command data to form a receive beam originating from a point on the surface of transducer array 20 at a steering angle typically corresponding to the point and steering angle of the previous ultrasound beam transmitted along a scan line 155. The beamformer 60 operates on the appropriate received signals by performing time delaying and focusing, according to the instructions of the command data from the control processing module 80, to create received beam signals corresponding to sample volumes along a scan line 155 in the scan plane 150 within the subject. The phase, amplitude, and timing information of the received signals from the various transducer elements 25 is used to create the received beam signals. For the spectral Doppler imaging mode, those received signals corresponding to sample volume locations within the sample gate 160 are further processed to generate a spectral Doppler timeline display.

The received beam signals are sent to processing architecture 70 over digital interface 117. Demodulation module 90 performs demodulation on the received beam signals to create pairs of I and Q demodulated data values corresponding to sample volumes within the sample gate 160. Demodulation is accomplished by comparing the phase and amplitude of the received beam signals to a reference frequency. The I and Q demodulated data values preserve the phase and amplitude information induced by Doppler shifts in the received signals.

Figure 3:
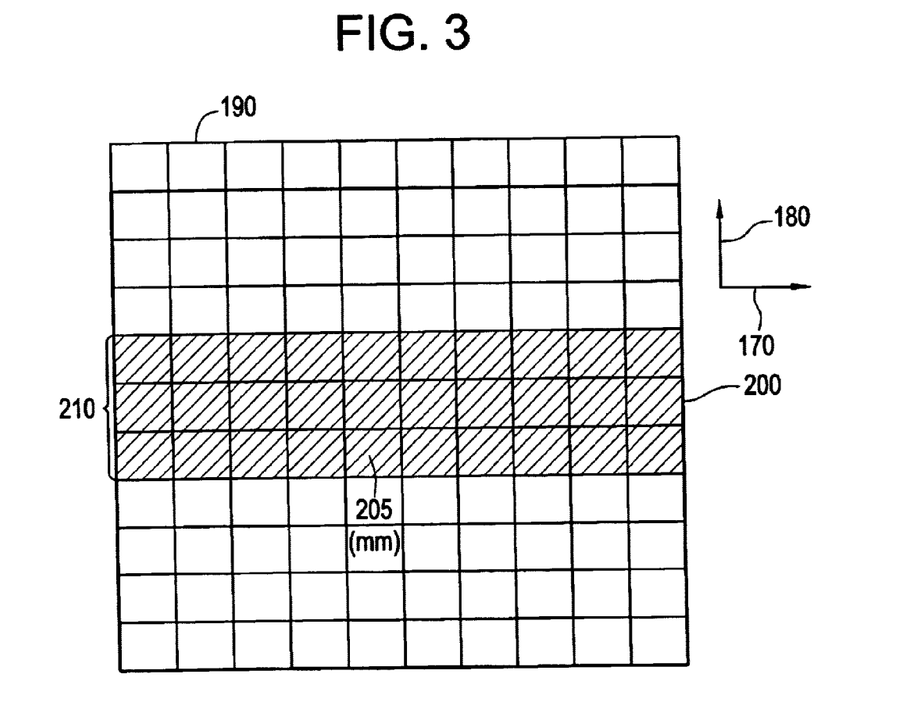
FIG. 3 illustrates the concepts of a spectral line, a frequency bin, and a kernel centered on a frequency bin.

The demodulated data is transferred to Doppler processing module 100. Doppler processing module 100 uses standard techniques such as discrete Fourier transform (DFT) processing to generate a set of spectral Doppler data corresponding to the signals received from the sample gate 160. The spectral Doppler data is stored in memory as spectral lines as shown in FIG. 3. FIG. 3 illustrates a subset of spectral lines in a time 170 versus Doppler frequency 180 format. The horizontal dimension is time 170 and the vertical dimension is Doppler frequency 180. A spectral line (e.g. 190) represents the Doppler frequency content (i.e. velocity content) of the blood flow in the sample gate 160 at a particular instant in time. Each spectral line (e.g. 190) is broken up into a set of frequency (velocity) bins. For example, frequency bin 200 contains the signal data for a particular velocity corresponding to the sample gate 160 over time.

The spectral lines of Doppler frequency data are passed to scan conversion module 110. Scan conversion module 110 processes the spectral lines of Doppler frequency data by performing a translation from scan sequence format to display format. The translation includes performing interpolation operations on the spectral lines of Doppler frequency data to create spectral display pixel data in the time versus frequency display format.

Figure 4:
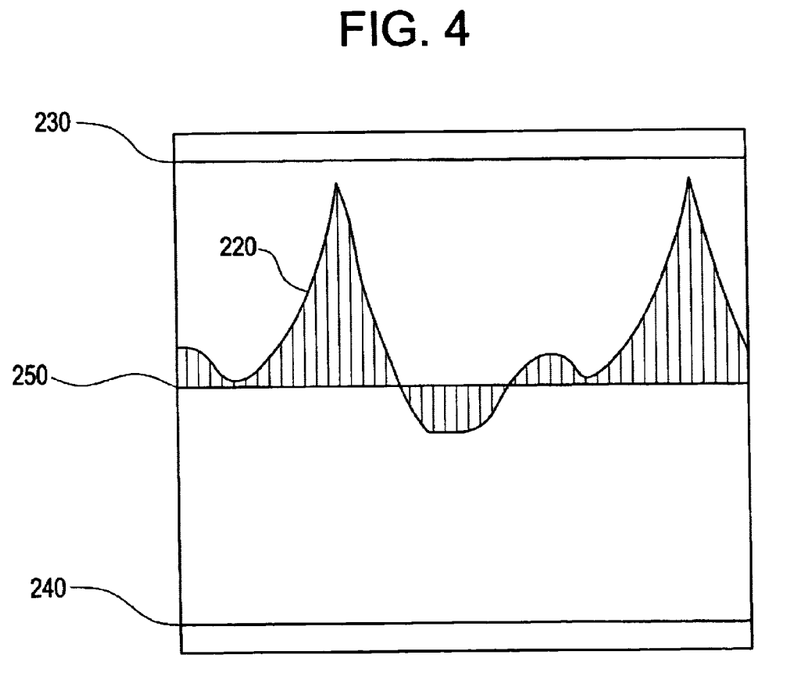
FIG. 4 illustrates a spectral Doppler image with no aliasing.

The scan converted pixel data is sent to display architecture 120. The display architecture 120 comprises a display processing module 130 to perform any final spatial or temporal filtering of the scan converted pixel data, to apply grayscale or color to the scan converted pixel data, and to convert the digital pixel data to analog data for display on monitor 140. A typical spectral Doppler timeline display looks like the spectrum 220 in FIG. 4. The display includes a spectrum 220 representing the spectral lines of data over time corresponding to the sample gate 160. The display also includes a maximum and a minimum velocity scale 230 and 240 corresponding to +PRF/2 and −PRF/2, respectively, indicating the baseline 250 should be shown at the 50% point in the image. Baseline 250 is the zero Doppler frequency reference of the display. However, it is not required for the baseline 250 to always be at the center of the display. Visualization of the spectrum 220 by an operator may be very good because the spectrum is adjusted such that there is no aliasing of the spectrum, the baseline is set in the center of the display, and the spectrum is not inverted (i.e. positive Doppler shifts are shown as being above the baseline and negative Doppler shifts are shown as being below the baseline).

Figure 5A:
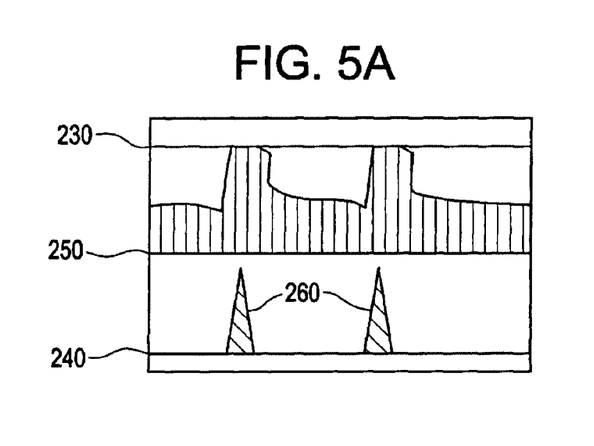
FIGS. 5a, 5b, and 5c are illustrations of unacceptable spectral Doppler images showing aliasing, inversion, and severe aliasing (totally wrapped spectrum).
Figure 5B:
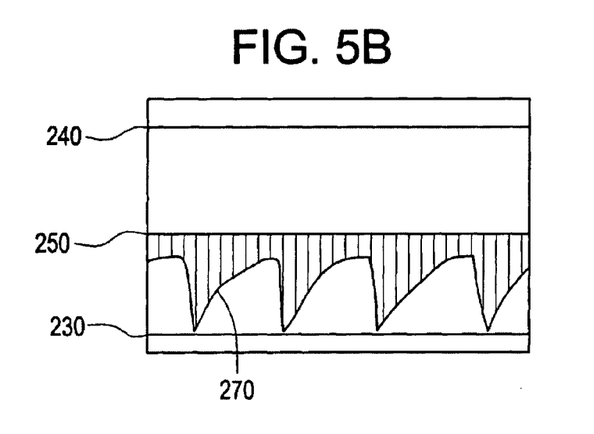
Figure 5C:
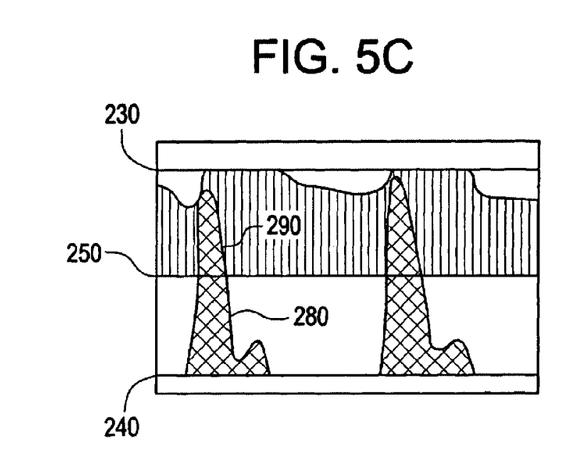

Many times, however, the spectral display is inadequate and the spectral images appear as in FIG. 5a, 5b, or 5c. FIG. 5a illustrates a spectral image that is aliased. The positive peaks 260 are wrapped around the velocity scale limits 230 and 240 into the negative frequency region below the baseline 250. Aliasing may be eliminated by positioning the baseline lower. FIG. 5b illustrates an inverted spectrum 270, where frequencies in the spectrum 270 are negative and being displayed below the baseline 250 which is often counter-intuitive. A fix is to invert the spectrum 270. FIG. 5c illustrates a case of severe aliasing where certain positive frequencies 280 of the spectrum are wrapped around the velocity scale limits into the negative frequency region below the baseline and certain other positive frequencies 290 are further wrapped above the baseline once again. The situation may be fixed by increasing the PRF and possibly adjusting the baseline 250 lower. A desirable feature is for the system to automatically control certain parameters that affect the spectral Doppler display to provide better visualization of the spectrum by the operator and to minimize the operator intervention, thus increasing the efficiency of the scanning session.

Figure 6:
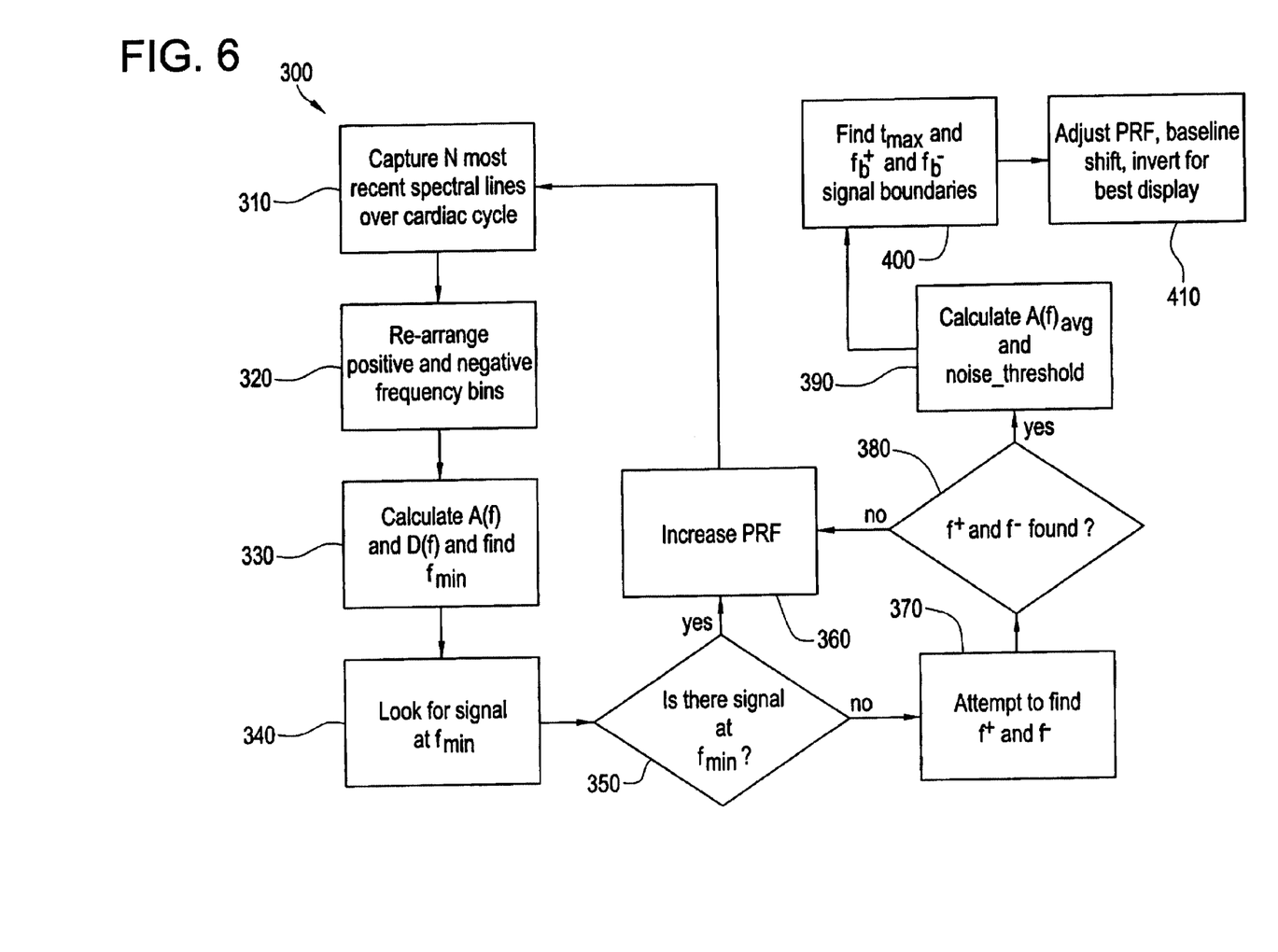
FIG. 6 is a flowchart illustrating a method employed to control certain parameters associated with generating a spectral Doppler image in accordance with an embodiment of the present invention.

FIG. 6 illustrates a method 300 employed to automatically adjust the appearance of a spectral Doppler image in accordance with an embodiment of the present invention. In step 310, control processing module 80 captures the N most recent spectral lines of data over at least a cardiac cycle from memory within display processing module 130, typically corresponding to about one second worth of data. Alternatively, the data may be captured by control processing module 80 from memory within the scan conversion module 110 or from memory within Doppler processing module 100.

Figure 7:
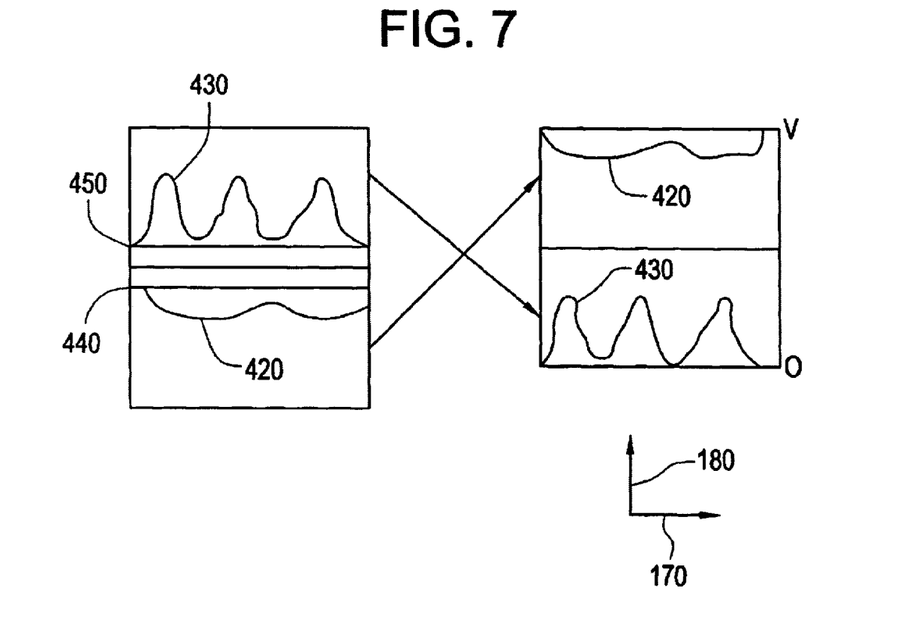
FIG. 7 illustrates the method step of re-arranging positive and negative frequency bins in accordance with an embodiment of the present invention.

In step 320, the data is re-arranged in memory to simplify the method 300. As illustrated in FIG. 7, positive and negative frequency bins are re-arranged in a more convenient coordinate system. Although other coordinate systems may support the same algorithm, the proposed coordinate system is convenient in that any aliased forward or reverse flow spectrum in the image is unfolded automatically for analysis. The negative portion of the spectrum 420 ends up at the top of the coordinate system and the positive portion of the spectrum 430 ends up at the bottom. The wall rejection region between frequency bins 440 and 450 is eliminated from the re-arranged data. The frequency bins are re-numbered 0 to V going from bottom to top in the re-arranged data. Frequency bins are along the vertical axis 180 and spectral lines (time bins) are along the horizontal axis 170 as shown.

Next, the method looks for aliasing and attempts to eliminate any aliasing found as follows. In step 330, control processing module 80 calculates image intensity A(f) and image deviation D(f) over the re-arranged data as a function of frequency bin f. A (f) is the pixel intensity for a given frequency bin f averaged over a kernel of N spectral lines by M frequency bins. D(f) is the standard deviation or mean absolute deviation of the pixel intensity for a given frequency bin f over the same N×M kernel. FIG. 3 is an example illustrating a kernel 210 (shaded region) centered over a frequency bin 200. In the example, A(f) for frequency bin 200 is calculated using the pixel intensity values in each spectral line/frequency bin location (n,m) within the kernel 210. The calculation is $$A(f) = \frac{\sum_n \sum_m P_{nm}}{(N*M)} \quad [1]$$

where $P_{nm}$ is the pixel intensity at location (n,m) (e.g. 205) within the kernel 210. In a similar way, the deviation D(f) may be calculated as $$D(f) = \sqrt{\frac{\sum_n \sum_m (P_{nm} - A(f))^2}{(N*M) - 1}} \quad [2]$$

or $$D(f) = \frac{1}{(N*M)} \sum_n \sum_m |P_{nm} - A(f)| \quad [3]$$

For each frequency bin f in the data, A(f) and D(f) are calculated using equations [1] and [2] or [3] with the kernel 210 centered over frequency bin f. Then, control processing module 80 determines the following parameters:

$f_{min}$ is the frequency bin where A(f) is a minimum value.
A($f_{min}$) is the image intensity at frequency bin $f_{min}$.
A(f)$_{max}$ is the maximum image intensity value at some frequency bin f.
D(f)$_{min}$ is the minimum deviation of image intensity at some frequency bin f.
D($f_{min}$) is the deviation of image intensity at frequency bin $f_{min}$.

In steps 340 and 350, control processing module 80 looks for the presence of signal at frequency bin $f_{min}$ as follows. First, the method checks to see if D($f_{min}$)>D(f)$_{min}$*threshold_1,
where threshold_1 is a pre-determined threshold.

If D($f_{min}$)>D(f)$_{min}$*threshold_1, then there is signal at $f_{min}$. The spectrum is assumed to be completely aliased. The method proceeds to step 360 where the PRF is increased, and then the method proceeds back to step 310 where the method starts over again at the new PRF. However, if D($f_{min}$)<D(f)$_{min}$*threshold_1, then the method checks more closely to see if there is truly signal at $f_{min}$ (For example, if very few pixels at $f_{min}$ contain signal, there may still be some amount of aliasing going on.) and proceeds as follows.

Figure 8:
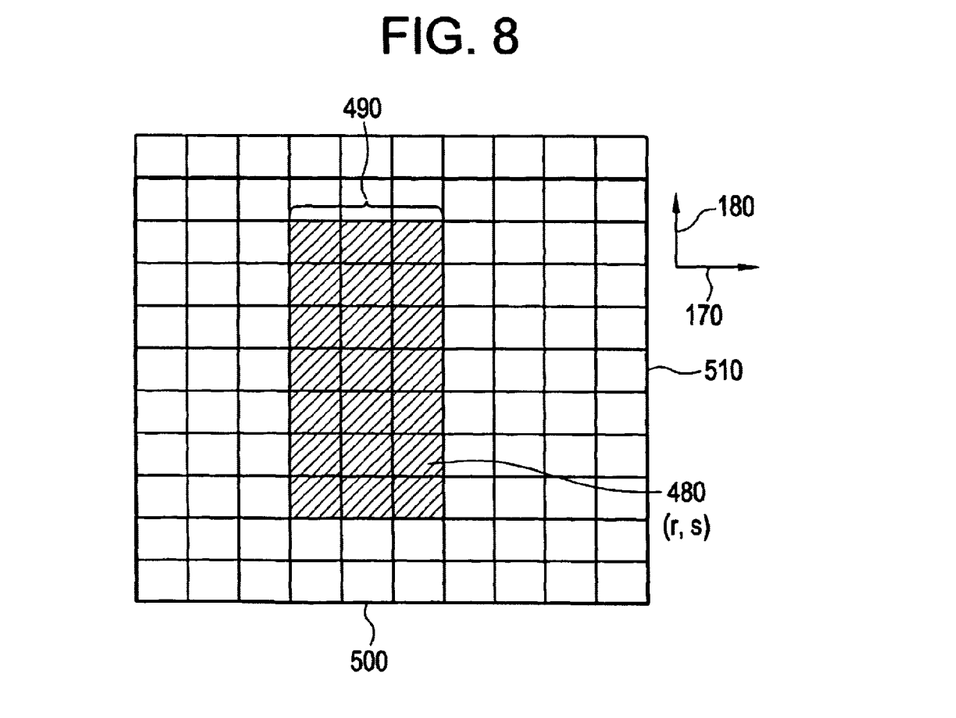
FIG. 8 illustrates the concept of a time bin (or spectral line) and a kernel being centered on a time bin.

Referring to FIG. 8, control processing module 80 calculates A(t) and D(t) for each of the N spectral lines (e.g. 500) with a kernel 490 centered on $f_{min}$ 510. A(t) is the image intensity and D(t) is the image intensity deviation calculated over kernel 490 of R frequency bins by S spectral lines for each spectral line t (e.g. 500). A(t) and D(t) are calculated by control processing module 80 as $$A(t) = \frac{\sum_r \sum_s P_{rs}}{(R*S)} \quad [4]$$

$$D(t) = \sqrt{\frac{\sum_r \sum_s (P_{rs} - A(f_{min}))^2}{(R*S) - 1}} \quad [5]$$

or $$D(t) = \frac{\sum_r \sum_s |P_{rs} - A(f_{min})|}{R*S} \quad [6]$$

where $P_{rs}$ is the pixel intensity at location (r,s) (e.g. 480) within the kernel 490. For each spectral line t in the data, A(t) and D(t) are calculated using equations 4 and 5 or 6 with the kernel 490 centered on frequency bin $f_{min}$ 510. Then, the following parameters may be identified:

A(t)$_{max}$ is the maximum image intensity at some spectral line t.
A(t)$_{min}$ is the minimum image intensity at some other spectral line t.

$$A(t)_{mean} \text{ is the mean image intensity} = \sum_s A(t_s)/S$$

D(t)$_{max}$ is the maximum image intensity deviation at some spectral line t.

$$D(t)_{mean} \text{ is the mean image intensity deviation} = \sum_s D(t_s)/S$$

Next, control processing module 80 checks for the following conditions:

is {A(t)$_{mean}$+G[D(t)$_{max}$, D(t)$_{mean}$]<A(t) for Q consecutive spectral lines}?,
where Q is a pre-determined number and G[D(t)$_{max}$, D(t)$_{mean}$] is a function of D(t)$_{max}$ and D(t)$_{mean}$, or
is {A(t)$_{max}$−A(t)$_{min}$>threshold_2}?, or
id {D(t)$_{max}$>threshold_3}?
where threshold_2 and threshold_3 are pre-determined thresholds.

If any of the above conditions are met, then there is signal at $f_{min}$. If there is signal at $f_{min}$ then the method proceeds to step 360 where the PRF is increased, and then the method reverts to step 310 where the method starts over again at the new PRF. If none of the conditions are met, then there is no signal at $f_{min}$, and the method proceeds to step 370.

In steps 370 to 400, the method 300 attempts to find the positive and negative signal boundaries $f_b^+$ and $f_b^-$, respectively. The signal boundaries are defined as the peaks of the spectrum in the image. First, in steps 370 and 380, a coarse search is performed. A first noise threshold is set by control processing module 80 as follows:

$$\text{noise\_threshold\_1} = A(f_{min}) + D(f)_{min} \quad [7]$$

where A($f_{min}$) and D(f)$_{min}$ are as last calculated. However, if D(f)$_{min}$ is less than a pre-determined threshold $T_1$, then $$\text{noise\_threshold\_1} = A(f_{min}) + T_1 \quad [8]$$

However, if noise_threshold_1>$A(f_{min})*T_2$ then $$\text{noise\_threshold\_1} = A(f_{min})*T_2 \quad [9]$$

where $T_1$ and $T_2$ are pre-determined thresholds. $T_1$ and $T_2$ are set to limit noise_threshold_1 in extreme cases where $D(f)_{min}$ is either too large or too small.

Next, in steps 370 and 380, control processing module 80 attempts to find a first frequency bin, starting from frequency bin zero 550 (see FIG. 9), where z consecutive frequency bins have A(f)<noise_threshold_1 and where z is a pre-determined number. The frequency bin is designated as f+ 530. Similarly, control processing module 80 continues and attempts to find a next frequency bin, starting from the highest frequency bin and proceeding downward, where z consecutive frequency bins have A(f)<noise_threshold_1. The frequency bin is designated as f− 520. If f+ and f− are not found, then step 380 causes the method to revert to step 360 where the PRF is increased, and then the method reverts to step 310. The iterative process continues until f+ and f− are found.

Figure 9:
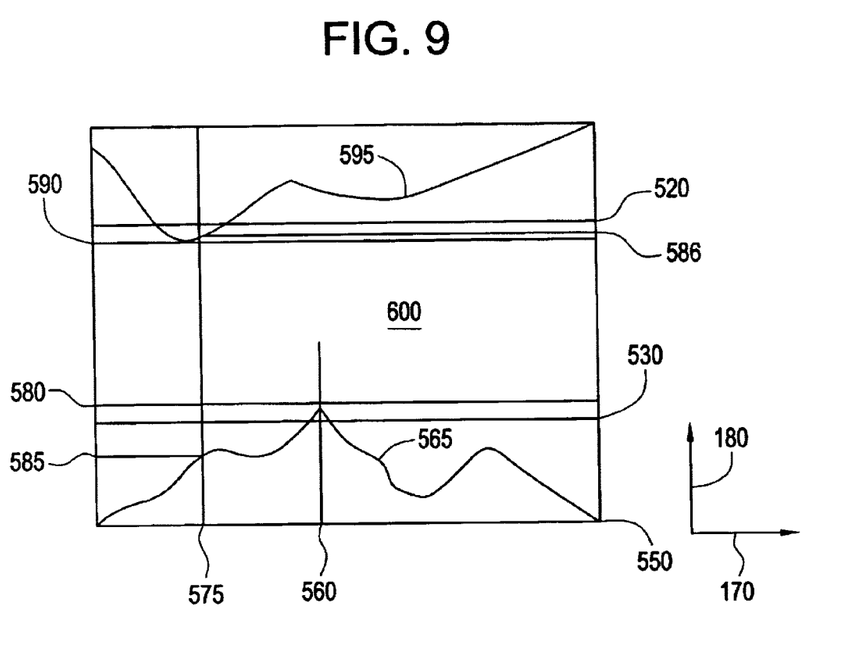
FIG. 9 illustrates finding signal boundaries in accordance with an embodiment of the present invention.

Once f+ and f− are found in steps 370 and 380, the method goes to step 390 where a final search for the signal boundaries $f_b^+$ and $f_b^-$ is performed. First, control processing module 80 calculates an average of A(f) for those frequency bins that are between f+ 530 and f− 520 as $$A(f)_{avg} = \frac{\sum_{f^+}^{f^-} A(f)}{(\text{\# of bins between } f^+ \text{ and } f^-)} \quad [10]$$

as illustrated in FIG. 9.

Next, a signal-to-noise ratio is calculated by control processing module 80 as $$SNR = [A(f)_{max} - A(f_{min})]/A(f_{min}), A(f_{min}) > 0 \quad [11]$$

where SNR is signal-to-noise ratio and $A(f)_{max}$ and $A(f_{min})$ are as previously defined and last calculated.

A noise threshold is then calculated as $$\text{noise\_threshold} = A(f)_{avg} * [1 + SNR * C_1], \text{ for } A(f_{min}) > 0 \quad [12]$$

or $$\text{noise\_threshold} = A(f)_{avg} + A(f)_{max} * C_1, \text{ for } A(f_{min}) = 0 \quad [13]$$

where $C_1$ is a pre-determined constant. However, the noise_threshold is limited such that noise_threshold may not be greater than $$\text{noise\_threshold} = A(f)_{avg} * C_2 \quad [14]$$

where $C_2$ is a pre-determined constant.

Once noise_threshold is determined, then in step 400, the method determines the final signal boundaries. First, the pixel intensity $A(t)_{f+}$ is calculated along the time dimension 170 centered at frequency bin f+ 530 averaged over a kernel of L spectral lines by K frequency bins. A scan line $t_{max}$ 560 is found where $A(t)_{f+}$ is a maximum. Referring to FIG. 9, pixel intensity A'(f) is then calculated for each frequency bin f, centered on spectral line $t_{max}$ 560 averaged over a kernel of I spectral lines by J frequency bins. Next, the first frequency bin $f_b^+$ 580 above f+ 530 is found that has h number of consecutive frequency bins with b $$A'(f) < \text{noise\_threshold} \quad [15]$$

where h is a pre-determined number.

The first frequency bin $f_b^+$ 580 is the positive signal boundary for the portion 565 of the spectrum. The negative signal boundary $f_b^-$ is found in a similar manner using f− 520 and noise_threshold for the portion 595 of the spectrum. The signal boundaries $f_b^+$ and $f_b^-$ define the final range of the total spectrum along the frequency bin axis 180 at the current PRF.

Once the range defined by the signal boundaries $f_b^+$ and $f_b^-$ is determined, final adjustments may be made in step 410 by control processor 80 to the PRF, baseline, and/or orientation, if necessary, to finalize the spectral display for visualization by an operator. The resultant spectral image is then displayed by display architecture 120 in the normal coordinate system.

Just as $f_b^+$ and $f_b^-$ were found for those spectral lines corresponding to the peaks in the spectrum, a similar methodology may be used to find the positive and negative limits for each spectral line. As a result, the information may be used to generate a spectral trace along the edges of the spectrum. Referring to FIG. 9, assume that a noise region 600 is defined as being above frequency bin $f_b^+$ 580 and below a frequency bin $f_b^-$ 590 where $f_b^+$ and $f_b^-$ are as previously calculated. The noise level is defined as the average of A(f) between $f_b^+$ 580 and $f_b^-$ 590 and is called noise_level.

Along each spectral line in the image (e.g. 575), A'(f) is calculated for each frequency bin f and averaged over a kernel of I spectral lines by J frequency bins. The maximum of A'(f) below $f_b^+$ 580 is found and is called $A'(f^+_{max})$ for a given spectral line (e.g. 575). A signal-to-noise (SNR) ratio is calculated as $$SNR = [A'(f^+_{max}) - \text{noise\_level}]/\text{noise\_level}, \text{ noise\_level} > 0 \quad [16]$$

by control processing module 80. A noise threshold is then calculated by control processing module 80 as $$T_{noise} = \text{noise\_level} * (1 + SNR * C_1) \quad [17]$$

or $$T_{noise} = A'(f^+_{max}) * C_1, \text{ for noise\_level} = 0 \quad [18]$$

where $C_1$ is a pre-determined constant.

Control processing module 80 finds the first frequency bin $f_{trace}$ 585 above $f^+_{max}$ that has h number of consecutive frequency bins with $A'(f) < T_{noise}$ where h is a pre-determined number. The frequency bin $f_{trace}$ 585 defines the location to display the positive trace for the spectral line (e.g. 575) under analysis. In a similar manner, the frequency bin corresponding to the location of the negative trace 586 for the spectral line (e.g. 575) is found. The process is performed for each spectral line to generate trace positions along the entire edge of the Doppler spectrum, both positive and negative. Display architecture 120 is then able to display the trace, on top of the spectrogram.

In conclusion, the advantages and features include, among others, an approach to automatically control parameters to generate a visually desirable spectral Doppler image based only on noise levels and signal-to-noise ratios actually present in the lines of Doppler spectral data. There is no reliance on any pre-calculated predictions of noise at various system stages and no assumptions are made about the presence of noise in a set of spectral lines or frequency bins. Locations of noise are deliberately distinguished from locations of signal. Automatic controlling of parameters results in eliminating aliasing, and adjusting the baseline and orientation of the spectral signal, if necessary, to present a visually desirable display of the spectral signal to an operator. The generation of a spectral trace corresponding to the edges of the spectral lines is also achieved based only on the lines of spectral Doppler data.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In an ultrasound system for generating a Doppler spectral image, a method to automatically establish a parameter used in connection with display of a Doppler spectral image, said method comprising:
   acquiring a plurality of spectral lines of Doppler data;
   determining a signal-free subset of Doppler data from said plurality of spectral lines of Doppler data;
   estimating at least one noise level from said signal-free subset of Doppler data; and
   automatically adjusting a parameter of a Doppler spectral image, including at least one of a baseline shift and spectrum orientation, based on said at least one noise level.

2. The method of claim 1 further comprising determining the presence of aliasing from said plurality of spectral lines of Doppler data, and automatically adjusting a pulse repetition frequency, in response to a determination of the presence of aliasing.

3. The method of claim 1 further comprising generating positive and negative frequency bins for said plurality of spectral lines of Doppler data, and re-arranging said positive and negative frequency bins.

4. The method of claim 1 further comprising generating frequency bins for said plurality of spectral lines of Doppler data and calculating an intensity level for a frequency bin by averaging a subset of Doppler data from said plurality of spectral lines of Doppler data.

5. The method of claim 1 further comprising calculating an intensity level for a spectral line by averaging a subset of Doppler data from said plurality of spectral lines of Doppler data.

6. The method of claim 1 further comprising generating frequency bins for said plurality of spectral lines of Doppler and determining a frequency bin having a minimum intensity level.

7. The method of claim 1 further comprising determining a spectral line of maximum intensity level from said plurality of spectral lines of Doppler data.

8. The method of claim 1 further comprising generating frequency bins for said plurality of spectral lines of Doppler data, and determining a frequency bin having a minimum intensity level, and determining if Doppler data associated with a frequency bin having a minimum intensity level contains signal information as opposed to only noise information.

9. The method of claim 1 further comprising determining a most positive signal boundary and a most negative signal boundary from said plurality of spectral lines of Doppler data and said at least one noise level.

10. The method of claim 1 further comprising determining positive and negative signal boundaries for each spectral line of said plurality of spectral lines of Doppler data, and generating and displaying a spectral trace along said signal boundaries.

11. In an ultrasound system for generating a Doppler spectral image, apparatus to automatically establish a parameter used in connection with display of a Doppler spectral image, said apparatus comprising a data processing module acquiring a plurality of spectral lines of Doppler data, and determining a signal-free subset of Doppler data from said plurality of spectral lines of Doppler data, and estimating at least one noise level from said signal-free subset of Doppler data, and automatically adjusting a parameter of a Doppler spectral image, including at least one of a pulse repetition frequency, a baseline shift and spectrum orientation, based on said at least one noise level.

12. The apparatus of claim 11 wherein said data processing module determines the presence of aliasing from said plurality of spectral lines of Doppler data, and automatically adjusts at least one of said pulse repetition frequency, said baseline shift, and said spectrum orientation in response to a determination of the presence of aliasing.

13. The apparatus of claim 11 further comprising a Doppler processing module generating positive and negative frequency bins of said plurality of spectral lines of Doppler data, and wherein said data processing module re-arranges said positive and negative frequency bins.

14. The apparatus of claim 11 further comprising a Doppler processing module generating frequency bins of said plurality of spectral lines of Doppler data, and wherein said data processing module calculates an intensity level for a frequency bin by averaging a subset of Doppler data from said plurality of spectral lines of Doppler data.

15. The apparatus of claim 11 wherein said data processing module calculates an intensity level for a spectral line by averaging a subset of Doppler data from said plurality of spectral lines of Doppler data.

16. The apparatus of claim 11 further comprising a Doppler processing module generating frequency bins of said plurality of spectral lines of Doppler data, and wherein said data processing module determines a frequency bin having a minimum intensity level.

17. The apparatus of claim 11 wherein said data processing module determines a spectral line of maximum intensity level from said plurality of spectral lines of Doppler data.

18. The apparatus of claim 11 further comprising a Doppler processing module generating frequency bins of said plurality of spectral lines of Doppler data, and wherein said data processing module determines a frequency bin having a minimum intensity level, and determines if Doppler data associated with a frequency bin having a minimum intensity level contains signal information as opposed to only noise information.

19. The apparatus of claim 11 wherein said data processing module determines a most positive signal boundary and a most negative signal boundary from said plurality of spectral lines of Doppler data and said at least one noise level.

20. The apparatus of claim 11 wherein said data processing module determines positive and negative signal boundaries for each spectral line of said plurality of spectral lines of Doppler data, and further comprising a display architecture for generating a spectral trace along said signal boundaries and displaying said spectral trace.

21. A medical diagnostic ultrasound system comprising:
   a transducer transmitting and receiving ultrasound signals within a scan plane of a subject;
   a beamformer deriving data samples representative of said ultrasound signals for a sample gate within said scan plane;
   a Doppler processing module generating a set of raw frequency bins of Doppler data from said data samples;

a scan conversion module scan converting said set of raw frequency bins of Doppler data;

a data processing module analyzing a plurality of spectral lines of Doppler data and automatically adjusting Doppler mode parameters, including at least one of a pulse repetition frequency, a baseline shift and spectrum orientation, to control a Doppler spectral image; and a display architecture displaying said Doppler spectral image corresponding to said sample gate within said scan plane.

22. The ultrasound system of claim 21 wherein said plurality of spectral lines of Doppler data is said set of raw frequency bins of Doppler data.

23. The ultrasound system of claim 21 wherein said plurality of spectral lines of Doppler data is scan converted image data derived from said set of raw frequency bins of Doppler data.

24. The ultrasound system of claim 21 wherein said sample gate is positioned over a location in said scan plane by an operator of said ultrasound system to define a region of interest over which data is collected and processed for generation of said Doppler spectral image.

25. The ultrasound system of claim 21 wherein said data processing module calculates an intensity level for a frequency bin by averaging a subset of Doppler data from said plurality of spectral lines of Doppler data.

26. The ultrasound system of claim 21 wherein said data processing module calculates an intensity level for a spectral line by averaging a subset of Doppler data from said plurality of spectral lines of Doppler data.

27. The ultrasound system of claim 21 wherein said data processing module determines the presence of aliasing from said plurality of spectral lines of Doppler data.

28. The ultrasound system of claim 21 wherein said data processing module estimates at least one noise level from said plurality of spectral lines of Doppler data.

29. The ultrasound system of claim 21 wherein said data processing module determines a most positive signal boundary and a most negative signal boundary from said plurality of spectral lines of Doppler data and at least one noise level.

30. The ultrasound system of claim 21 wherein said data processing module determines positive and negative signal boundaries for each spectral line of said plurality of spectral lines of Doppler data from at least one noise level and said plurality of spectral lines of Doppler data, and wherein said display architecture generates a spectral trace along said signal boundaries and displays said spectral trace.

* * * * *